WALL CLEANING IN A CRYSTALLIZATION VESSEL

Original Filed July 28, 1967

INVENTORS:
Francis Dambrine
Jean-Claude Giorgi
Jacques de Cremoux

By: Kurt Kelman Agent 3,687,636
Patented Aug. 29, 1972

3,687,636

WALL CLEANING IN A CRYSTALLIZATION VESSEL

Francis Dambrine, Marcq-en-Baroeul, Jean-Claude Giorgi and Jacques de Cremoux, Lille, France, assignors to Société Fives Lille-Cail, Paris, France Continuation of application Ser. No. 656,842, July 28, 1967. This application Mar. 2, 1970, Ser. No. 14,792
Claims priority, application France, July 28, 1966, 71,172
Int. Cl. B01d *9/00;* B08b *3/08;* F28g *9/00*
U.S. Cl. 23—273 R 7 Claims

ABSTRACT OF THE DISCLOSURE

An evaporating tank having a plurality of cells in which a saturated solution is crystallized. Each cell is provided with a set of ducts for irrigating and preventing soiling of the cell side walls, each duct irrigating only a predetermined portion of the perimetric length of the walls. A distributor valve delivers unsaturated solution individually and successively to the respective ducts in each set, so that only a predetermined side wall portion of each cell is irrigated at a time by the total amount of unsaturated solution available for that cell.

This is a continuation of our U.S. application Ser. No. 656,842, filed July 28, 1967, now abandoned.

This invention relates to new and useful improvements in the art of crystallization of solutions by evaporation in a continuous manner, and in particular the invention concerns itself with apparatus embodying an evaporating tank divided into a plurality of cells in which crystallization of a saturated solution takes place continuously and formed crystals pass successively through the cells to an outlet of the tank.

In apparatus of this type the side walls of the cells above the level of the saturated solution become soiled by undesirable formation of crystals thereon, which interferes with proper functioning and efficiency of the apparatus. In order to prevent such soiling of the cell side walls, it has been proposed to irrigate the exposed side wall surfaces with a film of an unsaturated solution so as to dissolve and detach the crystals formed thereon and wash the walls down into the crystallization zone in the lower region of the cells. However, as a practical matter, the amount of unsaturated solution necessary for maintaining proper concentration and continuous crystallization is not sufficient to provide a constant, uniform film of unsaturated solution which is required for effective washing down of the cell walls. Accordingly, it was necessary to either mix the unsaturated solution with the treated solution by recycling a portion of the latter, or to increase the amount of the unsaturated solution for periodic washing. Recycling of the treated solution is feasible only in the first few cells of the tank where very little crystallization occurs, and therefore this procedure is of no avail for the apparatus as a whole, especially the last few cells where crystallization is heavy. On the other hand, the alternative procedure involving periodic increases in the amount of the unsaturated solution automatically creates periodic variations in concentration and condition of the mass being crystallized in the various cells, so that auxiliary equipment is necessary for controlling and maintaining solution conditions at acceptable levels. Moreover, operation of the apparatus is made particularly difficult when such periodic variations occur.

It is, therefore, the principal object of the invention to eliminate the disadvantages above outlined and facilitate washing down the cell walls without recycling of the treated solution or unduly increasing the amount of unsaturated solution provided for each cell. This object is attained by providing in each cell a set of irrigation ducts, each one of which washes only a predetermined portion of the perimetric length of the cell walls, together with means for delivering a supply of unsaturated solution individually and successively to the respective ducts in each set so that only a predetermined side wall portion of each cell is irrigated at a time by the total amount of solution available for that cell. Thus, by individually washing down successive portions of the walls of each cell, the full available amount of solution is applied to each wall portion for effective dissolving of undesired crystals, and as the washing operation progresses from each wall portion to the next, the entire wall perimeter is subjected to adequate washing which would not be possible if the available solution supply were spread around the entire wall perimeter at once.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Figure 1:
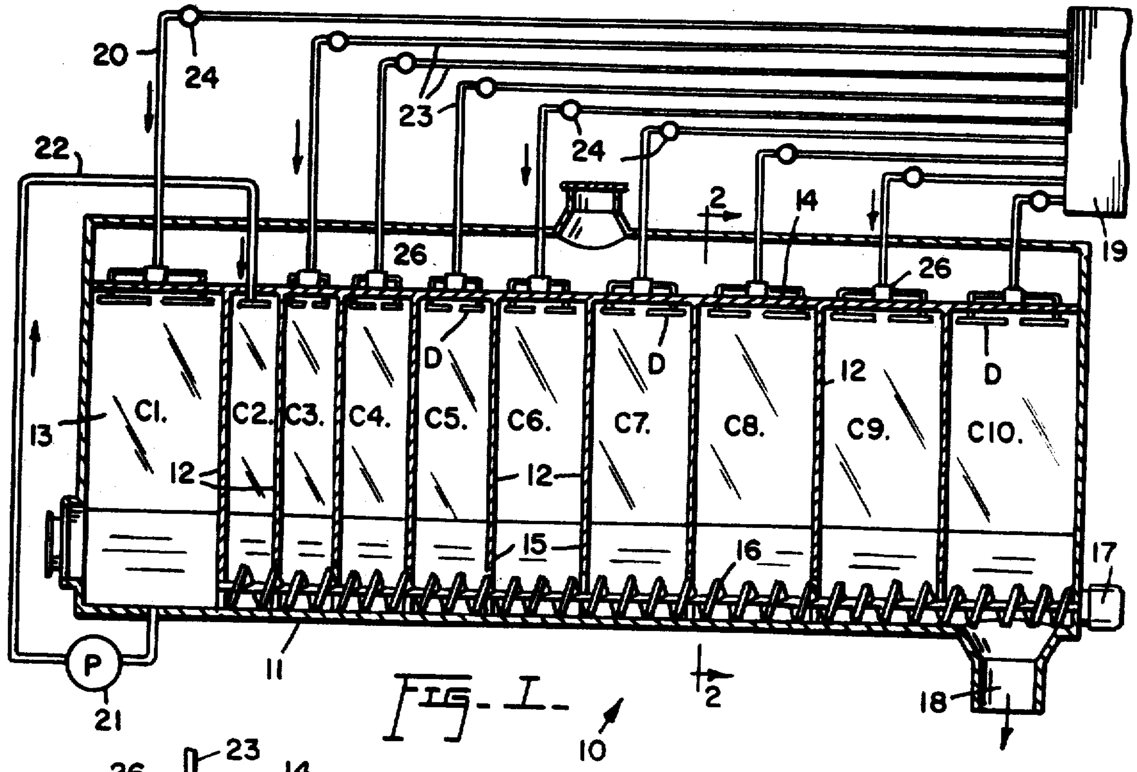
FIG. 1 is a longitudinal, vertical sectional view of the apparatus embodying the invention.
Figure 2:
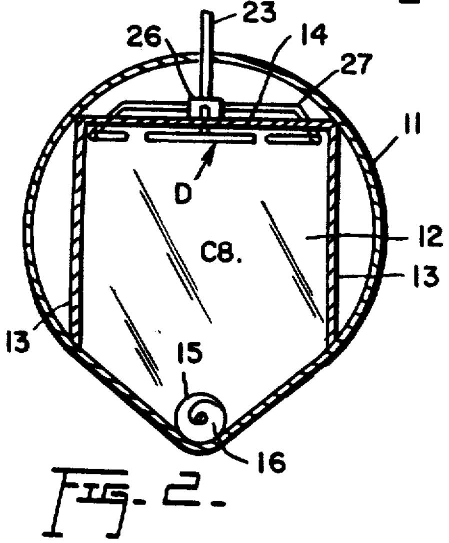
FIG. 2 is a fragmentary cross-sectional view, taken substantially in the plane of the line 2—2 in FIG. 1.

Referring now to the accompanying drawings in detail, the general reference numeral 10 designates an apparatus for continuous crystallization of solutions by evaporation, the apparatus as a whole being more-or-less conventional in construction and comprising a horizontally elongated evaporating tank 11 which is heated in a suitable manner and is divided by transverse partitions 12 into a plurality of compartments or cells C1, C2, C3, C4, C5, C6, C7, C8, C9 and C10, designated collectively as the cells C. Longitudinal wall members 13 in the tank coact with the partitions 12 to define the side walls of the cells C and the cells also have a top wall 14, as will be apparent from FIG. 2. The first cell C1 is isolated from the next cell C2, but all the other cells C2–C10 communicate with each other through openings 15 formed at the bottom of the intervening partitions 12. A conveyor screw 16, driven by a suitable motor 17, extends through the openings 15 for delivery of crystallizing mass from the cell C2 successively through the cells C3–C10 to the outlet 18 of the tank.

Unsaturated solution to be crystallized, one example of which may be sugar syrup, is delivered from a supply source 19 through a conduit 20 into the first cell C1 where it is concentrated to the saturation point and is then passed by a pump 21 through a conduit 22 into the second cell C2. There is, in the presence of heat, crystallization of the saturated solution commences to take place by evaporation, and as the crystallizing mass is conveyed by the screw 16 through the successive cells, the crystals become progressively enlarged until the end product is extracted through the tank outlet 18.

In order to maintain the concentration of the solution in each cell at the desired level, a certain amount of unsaturated solution is delivered into the cells C3–C10 from the source 19 through individual conduits 23 which, like the aforementioned conduit 20, are each equipped with a suitable flow control valve 24. The unsaturated solution delivered into these cells is utilized for washing down the side walls 12, 13 of the cells so as to prevent soiling of the side walls by undesired formation of crystals on side wall surfaces exposed above the crystallization zone in the lower region of the cells, that is to say, above the level of the saturated solution in which crystallization occurs. The amount of unsaturated solution admitted into each cell is limited, as a practical matter, by the concentration requirements of the solution in the crystallization zone, and because of this limitation it is not feasible to properly wash down the entire perimeter of all the cell side walls 12, 13 at the same time by a constant, adequate film of the unsaturated solution.

Figure 3:
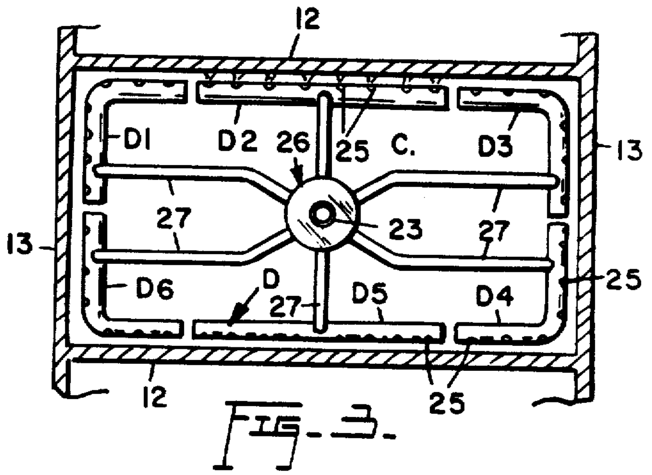
FIG. 3 is an enlarged horizontal sectional view of one of the cells with the top wall of the cell omitted for sake of illustration of the irrigation ducts.

However, the invention eliminates this difficulty and facilitates a proper washing down action by providing each of the cells with a set of irrigation ducts, the ducts in each set being designated collectively as D. Inasmuch as the duct arrangement for the several cells is substantially the same, a description of one such arrangement with reference to the example shown in FIG. 3 will suffice for all.

The duct set D of each cell C consists of a plurality of elongated ducts D1, D2, D3, D4, D5 and D6 which are disposed in end-to-end relation adjacent to and perimetrically of the cell side walls 12, 13, near the top wall 14. If desired, some of the ducts may be straight and others right-angled as shown in order to provide the perimetric formation. The ends of the ducts are closed, but lateral orifices 25 are provided along the ducts so that unsaturated solution delivered into the ducts as hereinafter described may be discharged against the cell side walls 12, 13 for dissolving undesired crystal formation on exposed surfaces of the walls and washing down the walls by a film of the unsaturated solution. It is to be particularly noted that inasmuch as each duct in the set has a length corresponding to only a predetermined portion of the perimetric length of the cell side walls, only that predetermined wall portion will be washed down by the solution discharged from the associated duct.

Figure 4:
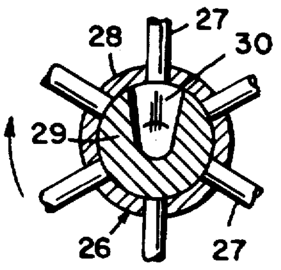
FIG. 4 is a fragmentary sectional detail of one of the distributor valves.

The unsaturated solution is delivered individually and successively to the ducts in each set by a distributor valve 26 connected to the supply conduit 23 of the associated cell, the valve 26 having a set of outlets 27 communicating with the respective ducts in the set. The distributor valve 26 may be of any suitable type and, by way of an example, FIG. 4 shows a rotary type valve having a housing 28 with ports for the several outlets 27, the housing containing a rotary valve member 29 which receives unsaturated solution from the associated conduit 23 at the center thereof and has a radial passage 30 which comes successively into register with the outlets 27 as the member 29 is rotated. The valve member 29 is rotated by any suitable motor drive (not illustrated), and while its rotation may be continuous, it is preferred that it be rotated intermittently, step-by-step with a pause of the member at each point where the passage 30 communicates with one of the outlets 27.

In any event, it is to be noted that the distributing valve 26 will deliver unsaturated solution individually and successively to the several ducts D1–D6, and that at any particular time the full amount of available solution passing through the conduit 23 will be delivered to only one of the ducts in the set for washing down only one particular perimetric portion of the side walls of the cell in which the duct set is disposed. Thus, by utilizing the full available flow of solution of washing down only one side wall portion of the cell, assurance is had that an adequate film of the solution is deposited on that side wall portion of effective dissolving and removal of undesired crystal formations, which would not be possible if the limited supply of the solution were spread all around the perimeter of the cell walls. Of course, as the distributor valve changes its delivery of solution from one duct to the next in the set, the washing down action will progress successively around the entire perimeter of the cell side walls, with each side wall portion receiving the benefit of treatment by full flow of the avaliable solution.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

We claim:

1. In an apparatus for crystallization of a solution by evaporation, which comprises
   (1) a source of the unsaturated solution,
   (2) an evaporating tank having a plurality of cells in which crystallization of the saturated solution takes place,
      (a) each of the cells having a top wall and a set of side walls forming the perimeter of the cell, and
   (3) means for preventing soiling of the side walls of each cell above the level of the saturated solution therein, the means in each of the cells comprising
      (a) a set of individual irrigation ducts disposed in a horizontal plane adjacent the perimeter and the top wall of the cell, each of the ducts defining orifice means oriented towards the side walls over only a portion of the perimeter, and
      (b) a distributor valve connected to the source of unsaturated solution and having a set of outlets communicating with the respective irrigation ducts, the valve being operative to deliver the total supply of unsaturated solution coming from the source individually and successively to each of the ducts with which the respective valve outlets communicate for irrigating one of the perimeter portions at a time.

2. The apparatus as defined in claim 1, wherein said irrigation ducts in each set are disposed in end-to-end relation, the length of each duct corresponding substantially to the perimeter portion of said side walls which the duct is intended to irrigate.

3. The apparatus as defined in claim 1, wherein said distributor valve is a rotary valve.

4. A method of preventing soiling of perimetric side walls of a cell wherein a solution is crystallized by evaporation, comprising the steps of supplying an unsaturated solution to the cell, and irrigating individually and successively only individual and successive perimetric portions of the side walls at a time with the total supply of the unsaturated solution.

5. In combination with a crystallization apparatus of the type wherein a solution is crystallized in an evaporating tank having walled compartments and wherein crystals tend to form upon the upper walled portions of said compartments above the level of the solution in each of said compartments, and a source of the unsaturated solution is connected to each of the compartments for supplying unsaturated solution thereto, the improvement of a plurality of irrigation means mounted in said tank, each of the irrigation means being associated with one of the compartments and being connected to the source of the unsaturated solution, and means for operating each irrigation means to direct the total supply of the unsaturated solution for the one compartment sequentially upon predetermined perimetric parts of the upper wall portions of the one compartment to irrigate in sequence one of the upper wall portion parts at a time with the total unsaturated solution supply so as to remove crystals formed thereon.

6. The combination of claim 5, further, comprising means for controlling the rate at which the unsaturated solution is supplied to the one compartment so as to control the concentration of the solution therein.

7. The combination recited in claim 5, wherein said irrigation means comprises:

(a) plurality of orifice means for delivering the unsaturated solution supplied upon said walls, each of said orifice means being mounted adjacent a predetermined portion of said walls whereby to irrigate only that predetermined portion of said walls; and (b) means for distributing the unsaturated solution supplied sequentially to one of said orifice means at a time whereby to irrigate in sequence one predetermined portion of said walls at a time.

References Cited

UNITED STATES PATENTS

| | | | |
|---|---|---|---|
| 1,189,752 | 7/1916 | Thompson | 165—95 |
| 1,817,232 | 8/1931 | Bührig | 165—11 S |

| | | | |
|---|---|---|---|
| 2,628,485 | 2/1953 | Toulmin | 159—13 A |
| 2,873,799 | 2/1959 | Earley | 159—13 A |
| 2,918,925 | 12/1959 | Dopler | 165—95 |
| 3,168,989 | 2/1965 | Heinemann | 159—4 C |
| 3,209,812 | 10/1965 | Sargeant | 159—13 A |
| 3,332,469 | 7/1967 | Rosenblad | 165—115 |

FOREIGN PATENTS

| | | | |
|---|---|---|---|
| 883,593 | 12/1961 | Great Britain | 165—95 |

NORMAN YUDKOFF, Primary Examiner

R. T. FOSTER, Assistant Examiner

U.S. Cl. X.R.

127—16; 134—171